Dec. 23, 1952     F. BALKIN     2,622,482
TRAFFIC VIEWING DEVICE
Filed Jan. 19, 1950     2 SHEETS—SHEET 1
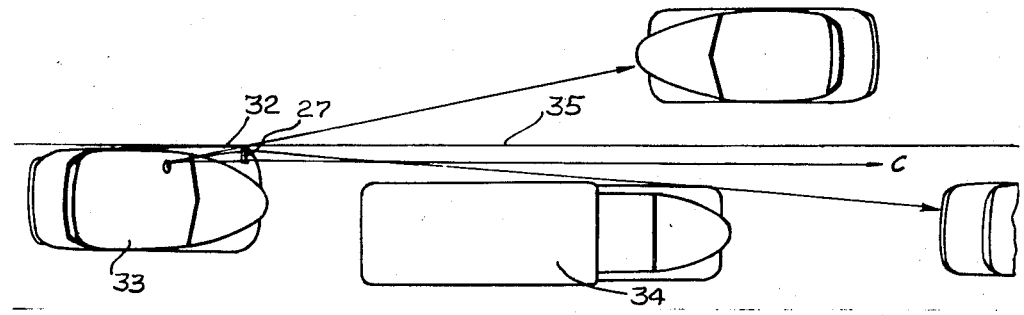
Fig.1.
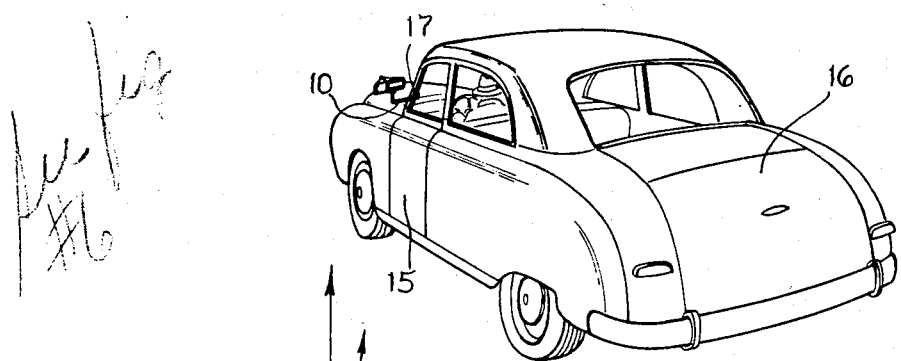
Fig.2.
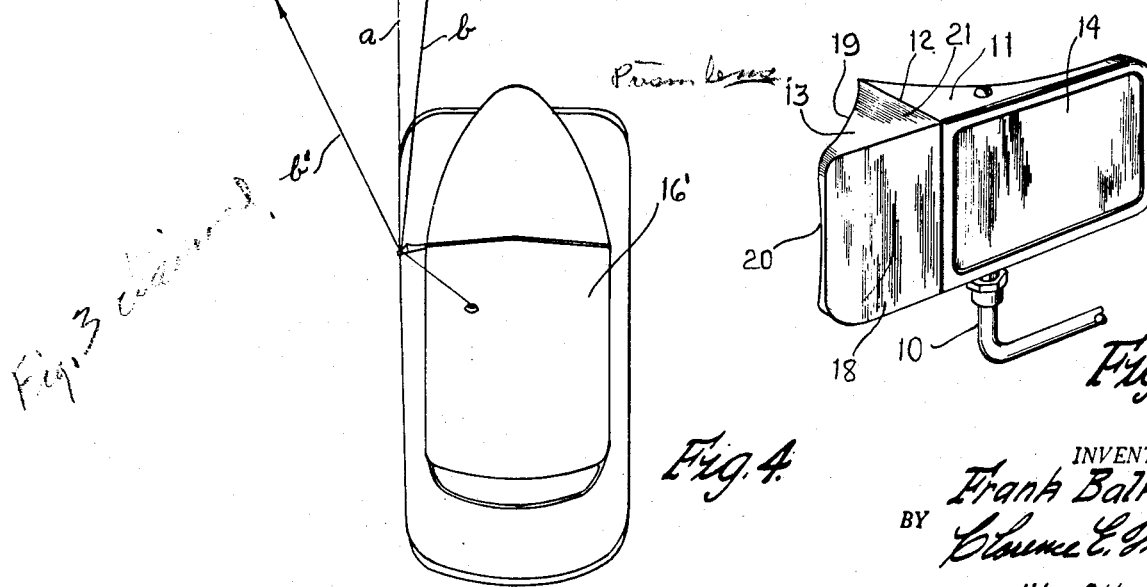
Fig.3.
Fig.4.
INVENTOR.
Frank Balkin
BY Clarence E. Threedy
His Attorney.

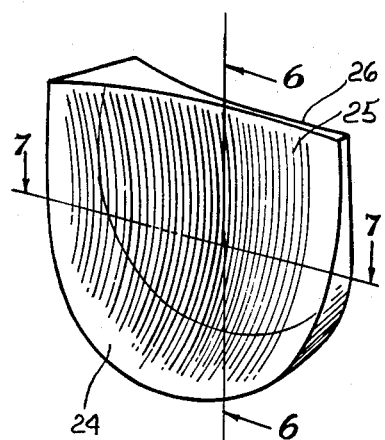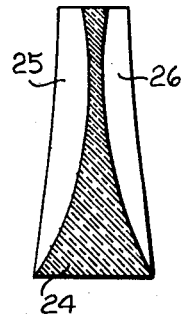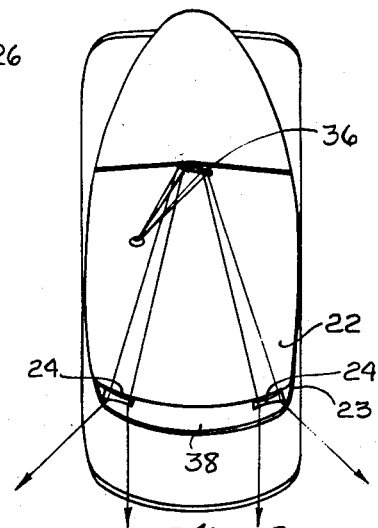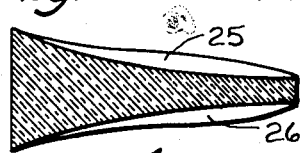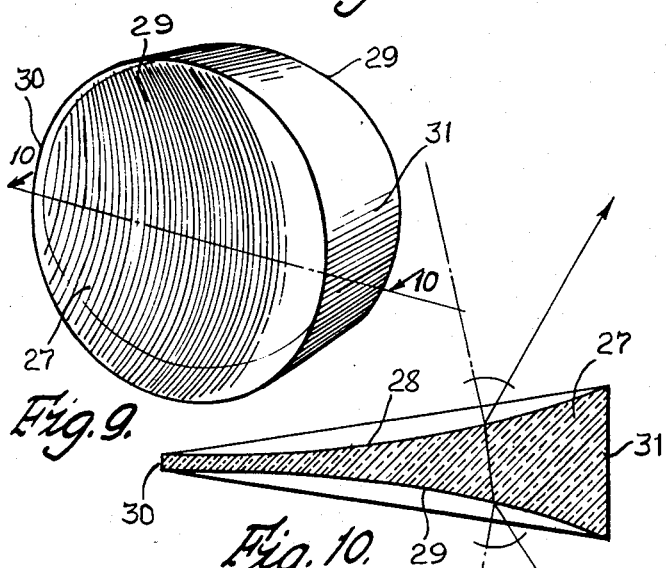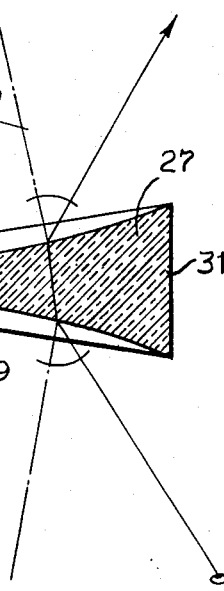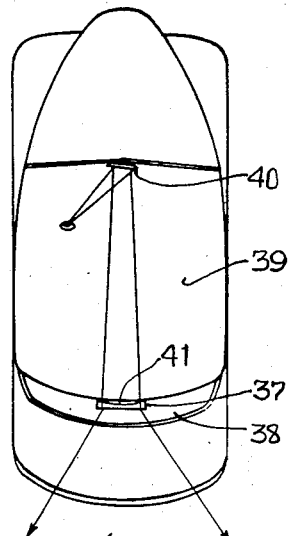

Patented Dec. 23, 1952

2,622,482

UNITED STATES PATENT OFFICE 2,622,482

TRAFFIC VIEWING DEVICE

Frank Balkin, Chicago, Ill.

Application January 19, 1950, Serial No. 139,365

1 Claim. (Cl. 88—93)

This invention relates to certain new and useful improvements in traffic viewing devices for use in connection with vehicles to afford the maximum view of the road over which the vehicle is traveling.

It is not uncommon for a driver of an automobile when driving upon the streets or highways to be confronted with a slow moving automobile truck which because of its size, particularly its length and width, obstructs the view of oncoming and cross-traveling vehicles. It is the common practice of vehicle drivers when confronted with such circumstances to maneuver the vehicle to a position with respect to the truck such as permits the driver of the vehicle to view the area of the road to the left of the automobile truck. In doing so, danger invariably confronts the driver of the vehicle by oncoming traffic which is out of his range of vision prior to and during maneuvering of the vehicle to a position where he would otherwise have an unobstructed view of a substantial part of the road up ahead of the automobile truck. Even when thus moving the vehicle for such view of the road ahead of the automobile truck the vehicle driver's vision is cut off by the truck from cross traffic, thus subjecting the driver of the vehicle to additional danger in passing up the truck.

It is the object of my invention to provide a traffic viewing device of a construction such as will not necessitate the driver of the vehicle to maneuver the vehicle out from behind the truck in order to have not only a clear view of the road ahead of such truck but also a view of cross traffic with respect thereto.

Another object of the invention is to provide a traffic viewing device of this character which will cover a larger area than heretofore accomplished by devices for similar purposes.

Another object of my invention is to provide a traffic viewing device of the character hereinafter described which will be especially useful when backing up the vehicle such as is done when parking the vehicle parallel or diagonal to a street curb. It is the object of the invention to provide a device such as will take in a wide downward as well as lateral area to the rear of the vehicle thus permitting the driver of the vehicle to see what is in back of the vehicle during the backing up operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a diagrammatic view illustrating one use of my invention;

Fig. 2 is a perspective view of an automobile showing one form of my invention associated therewith;

Fig. 3 is a perspective view of the form of the invention shown in Fig. 2;

Fig. 4 is a diagrammatic view showing the use of the invention illustrated in Fig. 3;

Fig. 5 is a perspective view of another form of the invention;

Fig. 6 is a sectional detail view taken substantially on line 6—6 of Fig. 5;

Fig. 7 is a sectional detail view taken substantially on line 7—7 of Fig. 5;

Fig. 8 is a diagrammatic view showing the use of the form of the invention illustrated in Figs. 5 to 7 inclusive;

Fig. 9 is a perspective view of the form of the invention, the use of which is shown in Fig. 1;

Fig. 10 is a sectional detail view taken substantially on line 10—10 of Fig. 9; and Fig. 11 is a diagrammatic view illustrating the use of another form of my invention.

My improved traffic viewing device is illustrated in the drawings and may take any one or more of the forms there illustrated and which forms I will now describe in detail.

Referring more particularly to Figs. 2 to 4 inclusive, the traffic viewing device there illustrated comprises an arm 10 carrying a suitable holder 11 which supports in any suitable manner along one edge 12 thereof a body 13 of transparent material such as optical or molded glass, plastic or the like. This holder supports in any approved manner a mirror 14 which reflects the view from the rear of the vehicle with which the arm 10 is associated.

Preferably this arm 10 is attached to the door 15 of the vehicle 16 as at 17 in any suitable manner. This holder and the arm 10 may be of any approved construction as will best serve the purpose and in itself constitutes no part of the present invention.

The body 13 is substantially triangular in cross section. It includes a relatively flat rectangular shaped rear surface 18 and a concave front surface 19 arranged at an angle with respect to the surface 18 to provide at the outer vertical edge of the body a relatively thin body portion 20 while forming at the inner vertical edge of the body a relatively thick body portion 21 as best shown in Fig. 3.

This form of viewing device affords a relatively wide viewing area. It permits the driver of the vehicle to view a substantial distance forwardly from both sides of a straight line *a* as indicated by lines *b* and *b'*. Such a device also affords a wide lateral view of the road to the left of the line *a*. It also affords a substantial viewing area to the right of the line *b*, thus enabling the driver to view cross traffic ahead of a vehicle being approached by the vehicle 16' as will be presently more fully described. The mirror affords a view to the rear of the vehicle.

The viewing device illustrated in Figs. 5 to 7 inclusive is especially useful within the vehicle 22 and preferably located at points adjacent the opposite rear corners 23 thereof within the area of the rear window 38. This traffic viewing device as illustrated in Figs. 5 to 7 inclusive comprises a body 24. This body 24 has opposite concave front and rear surfaces 25 and 26 trapezoidal in cross section on a vertical line and in plan view as shown in Fig. 5 with the larger of the bases of the trapezoid located toward the outside and bottom of the vehicle whereby to afford a relatively wide rearward and lateral viewing range as well as a downward view to the rear of the vehicle as diagrammatically illustrated in Fig. 8. This form of viewing device is exceptionally useful when backing up the vehicle or in the process of parking the same parallel or diagonal to the street curb. It also covers a large area to the rear of the vehicle eliminating bling spots.

The form of the viewing device diagrammatically illustrated in Fig. 1, is shown in Figs. 9 and 10. In this form of construction the device comprises a body 27 having opposite concave surfaces 28 and 29 and which if bisected substantially upon a medial line forms a trapezoid in medial cross section with the shorter of the bases 30 of the trapezoid located at a point farthest from the eye and with the wider of the bases 31 located at a point nearer the eye. When a viewing device of the form such as is shown in Figs. 9 and 10 is employed it is preferably mounted on the left front fender 32 of the vehicle 33. In such a position the driver of the vehicle 33 need maneuver the vehicle 33 slightly to the left in order to have a complete view along the line *c*, under which conditions the driver of the vehicle 33 will not only have a substantial clear view to the left and forward of the preceding vehicle 34 but, without passing the vehicle 33 over the dividing line 35 of the highway, may have an unobstructed view across traffic with respect to the vehicle 34. If the driver of the vehicle 33 finds the road ahead clear and free of cross traffic with respect to the truck 34 he may with safety pass the truck 34.

It is a common practice for vehicle drivers when driving away from a street curbing to first initially maneuver the vehicle slightly away from the curbing and then turn his body to a position to see whether there is any traffic coming from the rear. In most cases the danger is found in the initial moving of the vehicle to a position where the driven then turns his body to view the traffic coming from the rear of the vehicle. By the form of the device illustrated in Fig. 8, the driver of the vehicle 22 has a wide viewing area which enables him to view the traffic coming from the rear of the vehicle without turning his body or initially moving the vehicle 22. In such case he looks into the rear view mirror 36 wherein he views the viewing device mounted at opposite corners 23 of the vehicle. By looking into the mirror 36 to view the viewing device at the corners 23 the driver is also able to determine the closeness of any objects to the rear of the vehicle.

In the form shown in Fig. 11, the viewing device 37 is mounted in the center with respect to the rear window 38 of the vehicle 39 in line with the rear view mirror 40. This form of viewing device 37 provides but one concave surface 41.

By actual experience, I have found that my improved viewing device covers a greater area than devices heretofore used. My improved viewing device is especially useful in obtaining a view of the road alongside of and ahead of a leading vehicle about to be passed. It enables the driver of the passing vehicle not only to view the road up ahead of the vehicle to be passed but it also gives such driver a view of cross traffic with respect to the vehicle to be passed. This view of the cross traffic is accomplished without the driver of the passing vehicle maneuvering the vehicle into the opposite lane as he obtains this view before entering such lane.

The traffic viewing device embodying my invention may be formed of such material as will best serve the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations modifications as come within the scope of the appended claim.

Having thus described my invention, what I claim as new and desire to protect by Letters Patent is:

A traffic viewing device comprising a body substantially triangular in cross section and formed by transparent material, said body having a relatively flat rectangularly shaped rear surface, a concave front surface arranged at an angle relative to said rear surface to provide a relatively thin outer vertical edge to the body and a relatively thick base portion, a supporting holder having an edge surface portion secured to said thick base portion of said body, a second edge surface portion at an angle to said first edge surface and provided with means to support a rear view mirrow thereon in a plane substantially parallel to the said flat rectangular rear surface of said body, a supporting arm for mounting said device on a vehicle, and an adjustable supporting means providing pivotal connection between said holder and said supporting arm whereby the front and rear surfaces of said transparent body and said rear view mirrow may be extended in substantially vertical planes.

FRANK BALKIN.

REFERENCES CITED

The following references are of record in the file of this patent:

UNITED STATES PATENTS

| Number | Name | Date |
|---|---|---|
| 1,902,322 | David | Mar. 21, 1933 |
| 2,039,474 | Brunette | May 5, 1936 |
| 2,109,932 | Schneider | Mar. 1, 1938 |